(12) United States Patent
Boeckmann et al.

(10) Patent No.: US 7,991,618 B2
(45) Date of Patent: Aug. 2, 2011

(54) METHOD AND DEVICE FOR OUTPUTTING INFORMATION AND/OR STATUS MESSAGES, USING SPEECH

(75) Inventors: Ingo Boeckmann, Ribbesbuettel (DE); Holger Ebert, Nurembreg (DE); Matthias Heimermann, Wolfenbuettel (DE)

(73) Assignee: Volkswagen AG, Wolfsburq (DE)

( * ) Notice: Subject to any disclaimer, the term of this patent is extended or adjusted under 35 U.S.C. 154(b) by 0 days.

(21) Appl. No.: 12/193,367

(22) Filed: Aug. 18, 2008

(65) Prior Publication Data

US 2009/0157388 A1    Jun. 18, 2009

Related U.S. Application Data

(63) Continuation of application No. 09/807,638, filed as application No. PCT/EP99/06476 on Sep. 3, 1999, now abandoned.

(30) Foreign Application Priority Data

Oct. 16, 1998 (DE) .................................. 198 47 879
Feb. 25, 1999 (DE) .................................. 199 08 137

(51) Int. Cl.
  *G10L 11/00* (2006.01)
  *G10L 21/00* (2006.01)
(52) U.S. Cl. ........................................ 704/274; 704/270
(58) Field of Classification Search ................ 704/258, 704/260, 268, 270–275
See application file for complete search history.

(56) References Cited

U.S. PATENT DOCUMENTS

| | | | |
|---|---|---|---|
| 4,359,713 A | 11/1982 | Tsunoda | |
| 4,400,787 A | 8/1983 | Mandel et al. | |
| 4,623,970 A | 11/1986 | Toyomura | |
| 4,760,245 A | 7/1988 | Fukaya | |
| 5,007,095 A | 4/1991 | Nara et al. | |
| 5,012,221 A | 4/1991 | Neuhaus et al. | |
| 5,559,927 A | 9/1996 | Manfred | |
| 5,584,052 A | 12/1996 | Gulau et al. | |
| 5,612,869 A | 3/1997 | Letzt et al. | |
| 5,751,906 A | 5/1998 | Silverman et al. | |
| 5,796,916 A * | 8/1998 | Meredith | 704/258 |
| 5,864,805 A | 1/1999 | Chen et al. | |
| 5,966,691 A | 10/1999 | Kibre et al. | |
| 6,173,266 B1 | 1/2001 | Marx et al. | |
| 6,263,202 B1 | 7/2001 | Kato et al. | |
| 6,446,040 B1 * | 9/2002 | Socher et al. | 704/260 |
| 6,598,045 B2 | 7/2003 | Light et al. | |
| 6,601,029 B1 | 7/2003 | Pickering | |
| 6,839,670 B1 | 1/2005 | Stammler et al. | |

FOREIGN PATENT DOCUMENTS

| | | |
|---|---|---|
| DE | 30 41 970 | 5/1981 |
| DE | 31 41 254 | 10/1982 |
| DE | 43 25 096 | 2/1995 |
| DE | 38 40 711 | 4/1995 |
| DE | 195 03 419 | 8/1996 |
| DE | 195 33 541 | 3/1997 |
| DE | 196 46 634 | 5/1998 |
| JP | 01039892 | 2/1989 |
| JP | 08 247779 | 9/1996 |
| JP | 10104011 | 4/1998 |
| WO | WO 97/10583 | 3/1997 |

OTHER PUBLICATIONS

Mazor B., et al., "The Design of Speech-Interactive Dialogs for Transation-Automationsystems," Speech Communication, NJ Elsevier Science Publishers, vol. 17, (1995) No. 3/04, pp. 313-320.
International Search Report, PCT International Application No. PCT/EP1999/006476, mailed Mar. 23, 2000.

* cited by examiner

*Primary Examiner* — David R Hudspeth
*Assistant Examiner* — Samuel G Neway
(74) *Attorney, Agent, or Firm* — Kenyon & Kenyon LLP

(57) ABSTRACT

In a method and device for outputting information and/or messages from at least one device using speech, the information and/or messages required for vocal output are provided in a voice memory, the information and/or messages are read by a processing device according to a demand, and the information and/or messages are output via acoustic output device. The information and/or messages are output with a varying intonation according to their relevance.

5 Claims, 3 Drawing Sheets

METHOD AND DEVICE FOR OUTPUTTING INFORMATION AND/OR STATUS MESSAGES, USING SPEECH

CROSS-REFERENCE TO RELATED APPLICATIONS

The present application is a continuation of U.S. patent application Ser. No. 09/807,638, filed Jul. 11, 2001, now abandoned which is the national stage of PCT International Patent Application No. PCT/EP99/06476, having an international filing date of Sep. 3, 1999, each of which is expressly incorporated herein in its entirety by reference thereto.

FIELD OF THE INVENTION

The present invention relates to a method and a device for outputting information and/or status messages of at least one electrical device, using speech.

BACKGROUND INFORMATION

Methods and devices of this type are generally used in so-called interactive voice-communication systems or voice-controlled systems for, e.g. vehicles, computers, robots, machines, equipment, etc.

In general, an interactive voice-communication system (SDS) can essentially be reduced to the following components:
Speech recognition system, which compares an orally input command ("voice command") to other allowed voice commands, and decides which command, in all probability, was orally input;
Voice output, which outputs the voice commands and signal tones necessary for prompting the user, and possibly acknowledges the recognition result;
Dialog and sequencing control, in order to explain to the user which type of input is expected, to check if the input is consistent with the prompt and the current status of the application, and to trigger the resulting action in the application (for example, the device to be controlled);
Control interface as an interface to the application: Hidden behind it are hardware and software modules for controlling various actuators and computers, which contain the application; and
Application that is controlled by speech: For example, it can be an ordering or information system, a CAE workstation, or a wheel chair for the disabled.

For example, such a voice-communication system is described in German Published Patent Application No. 195 33 541. To increase the acceptance of such man-machine dialog, synonymous words or various pronunciations for the commands are used, or the words are rearranged in the commands. For example, "larger radius when turning left" can alternatively be expressed here as "when turning left, larger radius". In addition, a multilingual, interactive communication system independent of the speaker can be set up by expanding the memory, it being possible to alternatively switch between the interactive communication systems of various languages. In addition, ellipses may be used, i.e., dispensing with the repetition of complete command sentences, and instead using commands such as "higher", "sharper", or "further", the voice-communication system then assigning these to the preceding commands. In response to uncertain recognition, the voice-communication system can also pose questions such as "Excuse me?", "Please repeat that", or "What else?", or issue specific suggestions such as "Louder, please". All of these measures are used to avoid monotonic communication and to have the dialog more closely approximate human-to-human communication. To improve the communication, the voice system is coupled to an optical display medium, on which the recognized commands are indicated for control purposes. Furthermore, the optical display medium allows the display of functions from the target device which are set in response to the voice command; and/or the display of various functions/alternatives, which can subsequently be set or selected by a voice command. A disadvantage of this device and the method implemented thereby is that, despite the given improvements, the voice output tires the user due to its monotony, so that his or her reaction time is too slow during events requiring immediate action. An additional problem is that, in response to recognition difficulties, the voice-communication systems perform an endless loop and issue the user the same prompt again and again, so that the workflow is interrupted.

Therefore, it is an object of the present invention is based on the engineering to provide a method and a device for outputting information and/or status messages, using speech, in which the attentiveness of the user is improved.

SUMMARY

The above and other beneficial objects of the present invention are achieved by providing a device and method as described herein.

By using different intonations, the attention of the user is immediately obtained while the speech is being output, so that the reaction time for performing the requested instruction is considerably reduced. In the case of instructions requiring immediate action, the status messages have a command intonation.

To further increase the attention span, and the differentiation of instructions requiring immediate action, the volume of the voice output may be increased for instructions requiring immediate action, and/or these instructions may be inserted in a particularly harsh or abrupt manner.

In addition, the voice-communication system may be designed to use multiple voices, so that, for example, one may choose between a man's voice and a woman's voice. One of these voices are selected by the system, for instructions requiring immediate action, and the other is selected by the system, for information or status messages not requiring immediate action.

To ensure the workflow, the voice-communication system is only activated by actuating a "Push to talk" (PTT) switch, the dialog-communication level being changed in the absence of a valid interaction. To increase the recognition reliability and improve the user prompting, individual commands may be saved in various, alternative output forms, which are then successively output in response to an invalid interaction. The dialog-communication level is only changed when a valid interaction does not ensue in response to all of the command forms. To avoid monotony, the sequence of the output may be permutated by a random-number generator.

In an exemplary method for outputting information and/or status messages of at least one electrical device, using speech, the information and/or status messages needed for the voice output may be stored in a speech memory, read out by a processing device on demand, and output by an acoustic output device, especially a loudspeaker, characterized in that the information and/or status messages may be output using different intonations, depending on relevance.

The basis of the present invention is to use the manner in which speech is output to the motor vehicle driver, in order to create an emotion that causes one to act in accordance with the situation.

BRIEF DESCRIPTION OF THE DRAWINGS

FIG. 2a illustrates a graph of a potential danger during an interaction that does not require immediate action.

FIG. 2b illustrates a denotation graph corresponding to FIG. 2a.

FIG. 2c illustrates an intonation graph corresponding to FIG. 2a.

FIG. 2d illustrates a connotation graph corresponding to FIG. 2a.

FIG. 3a illustrates a graph of a potential danger during an interaction that requires immediate action.

FIG. 3b illustrates a denotation graph corresponding to FIG. 3a.

FIG. 3c illustrates an intonation graph corresponding to FIG. 3a.

FIG. 3d illustrates a connotation graph corresponding to FIG. 3a.

DETAILED DESCRIPTION

The voice-communication system is activated by actuating a PTT switch. For clarity, the voice output of the voice-communication system is subdivided into commands KOM and prompts Auff which, in reality, may be identical. Hereinafter, commands KOM are to be understood as a direct instruction to act, such as "BRAKE" or "TURN ON LIGHT"[7], whereas prompts Auff request an interaction in the form of an input, such as "Please specify desired temperature in degrees C."

If the voice-communication system now generates a command KOM, then this command KOM is subdivided according to whether it is an instruction requiring immediate action or an instruction not requiring immediate action. More simply, instructions requiring immediate action are commands KOM, which call for the action to be performed quickly. An example of this is command KOM "Brake", when an ADR system or a precrash sensory system has detected a collision object. Examples of instructions not requiring immediate action include commands KOM of a navigation system. In this context, instructions requiring immediate action are inserted in time $t_1$, with command-intonation voice S1 and high volume L1, in a harsh and abrupt manner, in order to produce a high degree of attentiveness in the user. However, instructions not requiring immediate action are inserted softly, at low volume L2 and normal intonation S2.

As a rule, time is not a critical factor in the case of prompts Auff; so that, in this case, good user prompting is of concern. For this purpose, n different alternatives of a prompt Auff may be stored in the speech memory. For example, the alternatives may be different emphases, pronunciations, word rearrangements, or synonymous terms. After acoustically outputting the first alternative, the voice-communication system waits for a predetermined period of time for an interaction. If no interaction or an invalid interaction occurs within this time period, then the voice-communication system repeats the prompt, using the subsequent alternative up to the nth alternative, if necessary. If a valid interaction occurs, then this request is performed and, if necessary, a new prompt Auff is output. But if no valid interaction occurs in response to the nth alternative, then the system switches to another dialog-communication level DKE, in order to ensure the workflow. For example, new dialog-communication level DKE may then be a selection list, which is displayed on the trip-computer monitor, and from which the user may select a corresponding menu.

Figure 1:
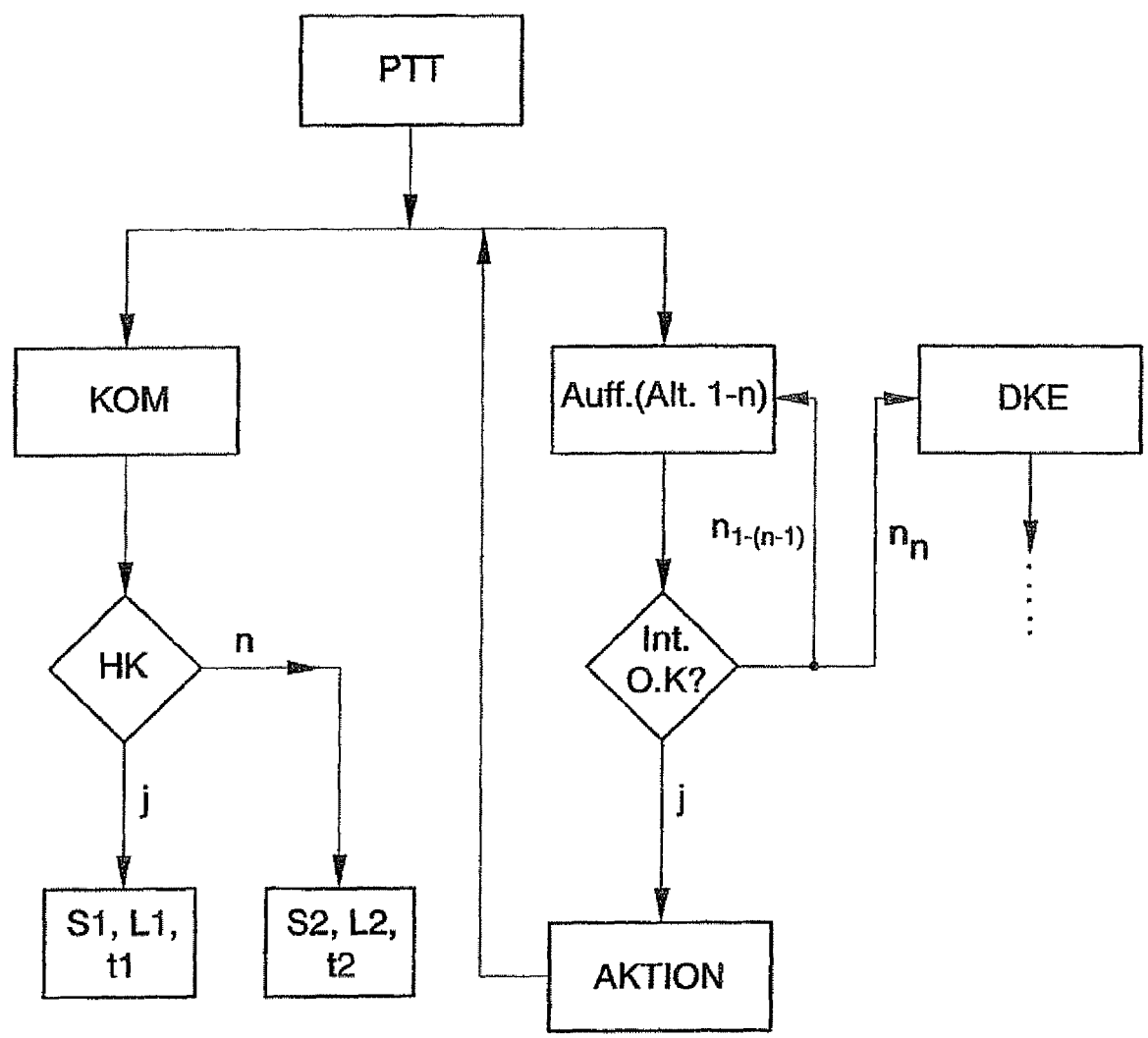
FIG. 1 is a flowchart illustrating a method for automatically controlling at least one device using speech recognition according to the present invention.
Figure 2:
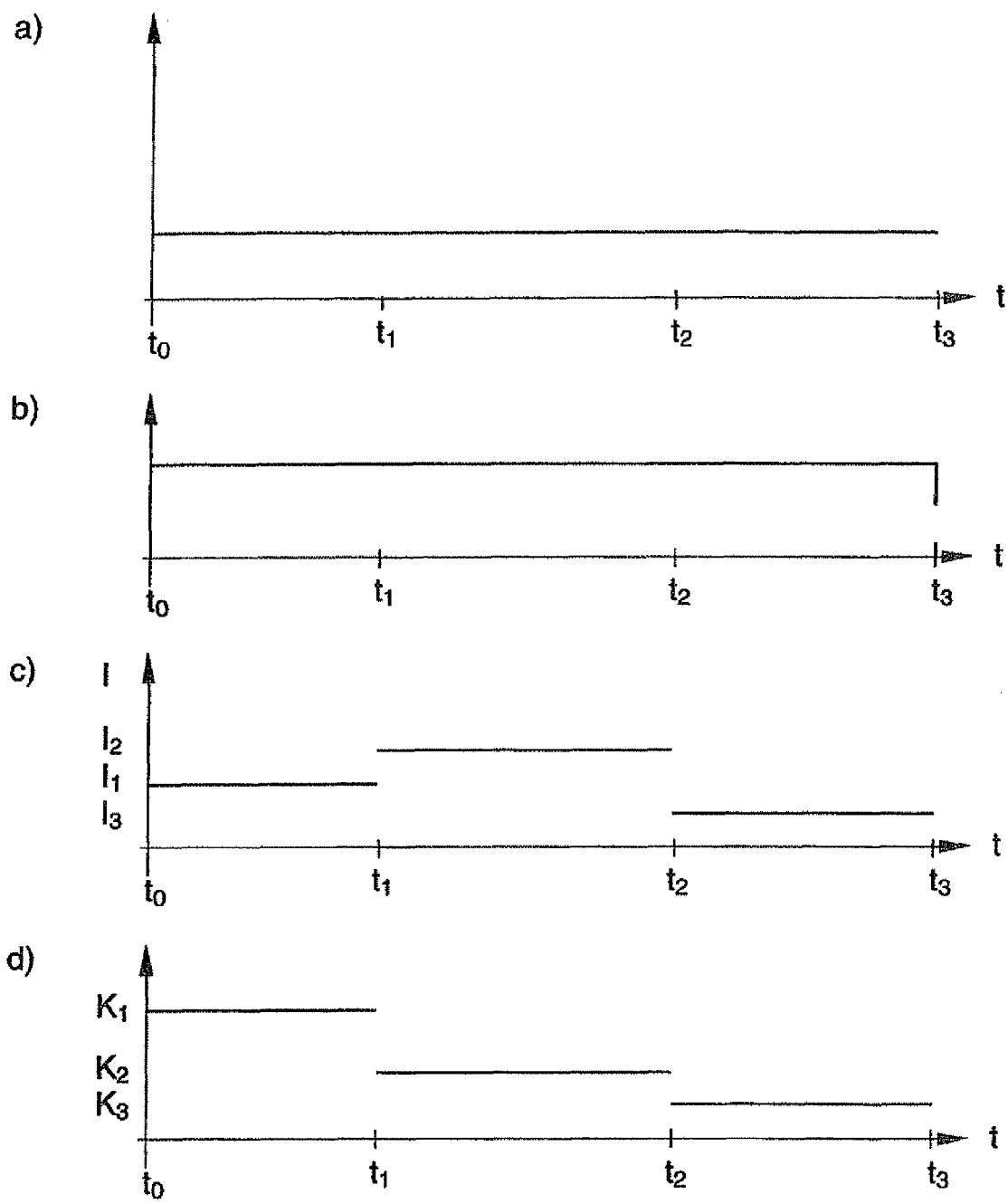

FIGS. 2a-d schematically represent the conditions for an instruction not requiring immediate action, such as an information prompt for a navigation system. In FIG. 2a, the importance of the interaction is plotted over time. Instructions for action are output at times $t_0$-$t_2$, and it is assumed that there was no reaction to each preceding prompt. Since a missing input in the navigation system only results in the inoperability of comfort components, which are also not necessarily desired by the motor vehicle driver, the importance does not change over time. The information regarding the content of the command, or the so-called denotation, i.e. the input request, also remains constant over time; as illustrated in FIG. 2b. At time to, the motor vehicle driver may be prompted, "Please input your desired destination now.", This prompt is issued, using a certain intonation $I_1$ and a certain connotation K1, which are illustrated in FIGS. 2c and 2d. If nothing is input, then the system does not know the reason for omission, e.g., if the motor vehicle driver did not hear the request or deliberately intended not to perform it. Therefore, the prompt, "Would you like to input a destination," is issued again at time $t_1$, using a stronger intonation $I_2$, in order to improve the possibility of it being perceived. However, connotation level K2 decreases. If, in response, nothing is input again, then the system may certainly determine that the motor vehicle driver does not wish to do this. To avoid annoying the motor vehicle driver with constant repetition, a prompt such as "If you do not wish to input a destination, I will now turn myself off" is then issued one last time, at time $t_2$. This last prompt is output, using a very low intonation $I_3$, and it just has a low connotation. As illustrated in FIG. 2d, the connotation forms an anticlimax, i.e., a transition from a strong to a weak expression, whereas a certain variation occurs in the intonation, in order to counteract monotony.

In contrast, FIGS. 3a to 3d illustrate represent a situation in which the importance of the interaction increases over time, until action is finally required. For example, the motor vehicle travels on a motorway at a speed greater than an allowed speed, while maintaining the safety distance behind a motor vehicle. At time to, the system issues an action instruction to the motor vehicle driver, e.g., in the form of "Please adjust your speed." The action instruction has a low intonation degree $I_1$ and a correspondingly low connotation level K1 since the motor vehicle driver is indeed acting illegally, but no immediate danger exists. In addition, it is now assumed that the motor vehicle driver does not adjust his or her speed, and that his or her distance has just barely fallen below the safety distance, at time t. In other words, the potential danger of the traffic situation increases, which is illustrated by the rising curve in FIG. 3a.

Figure 3:
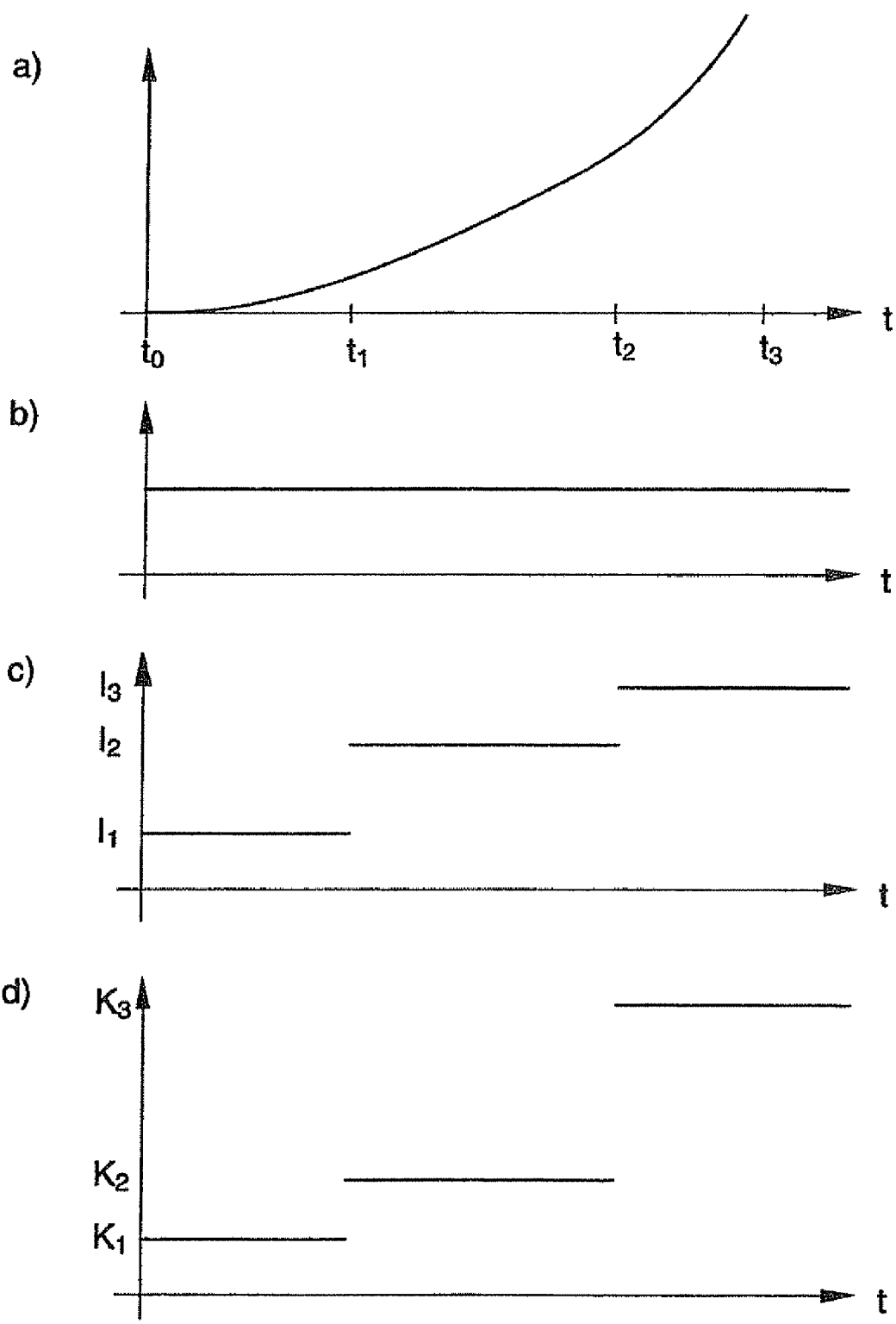

Consequently, the system issues the motor vehicle driver an action instruction, e.g., in the form of "You must brake" or "Please brake", this action instruction having a higher intonation degree $I_2$ along with a correspondingly higher connotation level K2. If the motor vehicle driver also does not react to this, then the potential danger of the traffic situation is increased further, which is illustrated by the additional rise in FIG. 3a. This means that a further failure of the motor vehicle driver to react could lead to an accident in a very short time. This instruction requiring immediate action can, for example, be output in the form of "Brake hard", using command intonation $I_3$. In this case, the connotation levels illustrated in FIG. 3d represent a climax, i.e. the increase in the expression, from less important to more important. In addition, it should be noted that the changes illustrated in FIGS. 2a to 2d and FIGS. 3a to 3d are not according to scale, but are rather to be understood as qualitative information.

What is claimed is:

1. A method for outputting at least one of information and status messages not requiring immediate action of at least one electrical device using speech, comprising:

storing the at least one of information and status messages not requiring immediate action relating to a voice output in a speech memory in a plurality of speaking voices;

choosing by a processing device a speaking voice for the at least one of information and status messages not requiring immediate action from the plurality of speaking voices in accordance with at least one of relevance and importance;

selectively reading the at least one of information and status messages not requiring immediate action by the processing device; and outputting the at least one of information and status messages not requiring immediate action on an output device at a first prompt time, using a first prompt intonation chosen by the processing device, a first prompt connotation chosen by the processing device, and the speaking voice chosen by the processing device in accordance with at least one of relevance and importance;

wherein in the absence of an input after the first prompt time, outputting the at least one of information and status messages not requiring immediate action on the output device at a second prompt time, using a second prompt intonation, using a second prompt connotation, and using the speaking voice, chosen by the processing device; and wherein the second prompt intonation is increased compared to the first prompt intonation, and the second prompt connotation is decreased compared to the first prompt connotation.

2. The method according to claim 1, wherein the choosing by the processing device of the speaking voice includes choosing by the processing device a prompt speaking voice for the at least one of information and status messages not requiring immediate action.

3. The method according to claim 2, wherein the outputting includes outputting the at least one of information and status messages not requiring immediate action on the output device using a prompt volume, chosen by the processing device.

4. The method according to claim 1, wherein the outputting includes, in the absence of an input after the second prompt time, outputting the at least one of information and status messages not requiring immediate action on the output device at a third prompt time, using a third prompt intonation, using a third prompt connotation, and using the prompt speaking voice, chosen by the processing device; and wherein the third prompt intonation is decreased compared to the first prompt intonation and the second prompt intonation, and the third prompt connotation is decreased compared to the first prompt connotation and the second prompt connotation.

5. The method according to claim 4, wherein the first, second, and third prompt connotations form an anticlimax by a transition from a strong to a weak expression.

* * * * *